United States Patent [19]

Aresty

[11] 4,155,346
[45] May 22, 1979

[54] SOLAR ENERGY COLLECTOR

[76] Inventor: Robert J. Aresty, 553 Pretty Brook, Princeton, N.J. 08540

[21] Appl. No.: 821,628

[22] Filed: Aug. 4, 1977

[51] Int. Cl.² .................................................. F24J 3/02
[52] U.S. Cl. .................................... 126/271; 285/31; 165/75; 165/76; 165/173
[58] Field of Search ............... 126/270, 271; 237/1 A; 165/75, 76, 173; 285/31, 32; 248/15; 60/641

[56] References Cited

U.S. PATENT DOCUMENTS

| | | | |
|---|---|---|---|
| 1,119,063 | 12/1914 | Burnap | 126/271 |
| 3,859,980 | 1/1975 | Crawford | 126/271 |
| 4,055,163 | 10/1977 | Costello et al. | 126/271 |
| 4,060,070 | 11/1977 | Harter | 126/271 |
| 4,066,281 | 1/1978 | De Bonis | 285/31 |
| 4,067,317 | 1/1978 | Hubbard | 126/271 |

Primary Examiner—James C. Yeung
Attorney, Agent, or Firm—Lerner, David, Littenberg & Samuel

[57] ABSTRACT

A solar energy collector comprising a pair of manifolds for coupling one or more solar energy collectors thereto. The manifolds are provided with connectors including "O" ring sealing means for slideably receiving and connecting the open ends of collector tubes thereto. The manifolds are maintained within housings filled with foam insulation means for supporting the manifolds within the housings. Mounting brackets are coupled to the housings for facilitating securement of the housings to any suitable supporting surface. The housings and their respective manifolds are designed and arranged so as to facilitate simple and rapid installation, removal and reassembly of the collector tubes and may be spaced so as to accommodate tubes of varying lengths.

25 Claims, 19 Drawing Figures

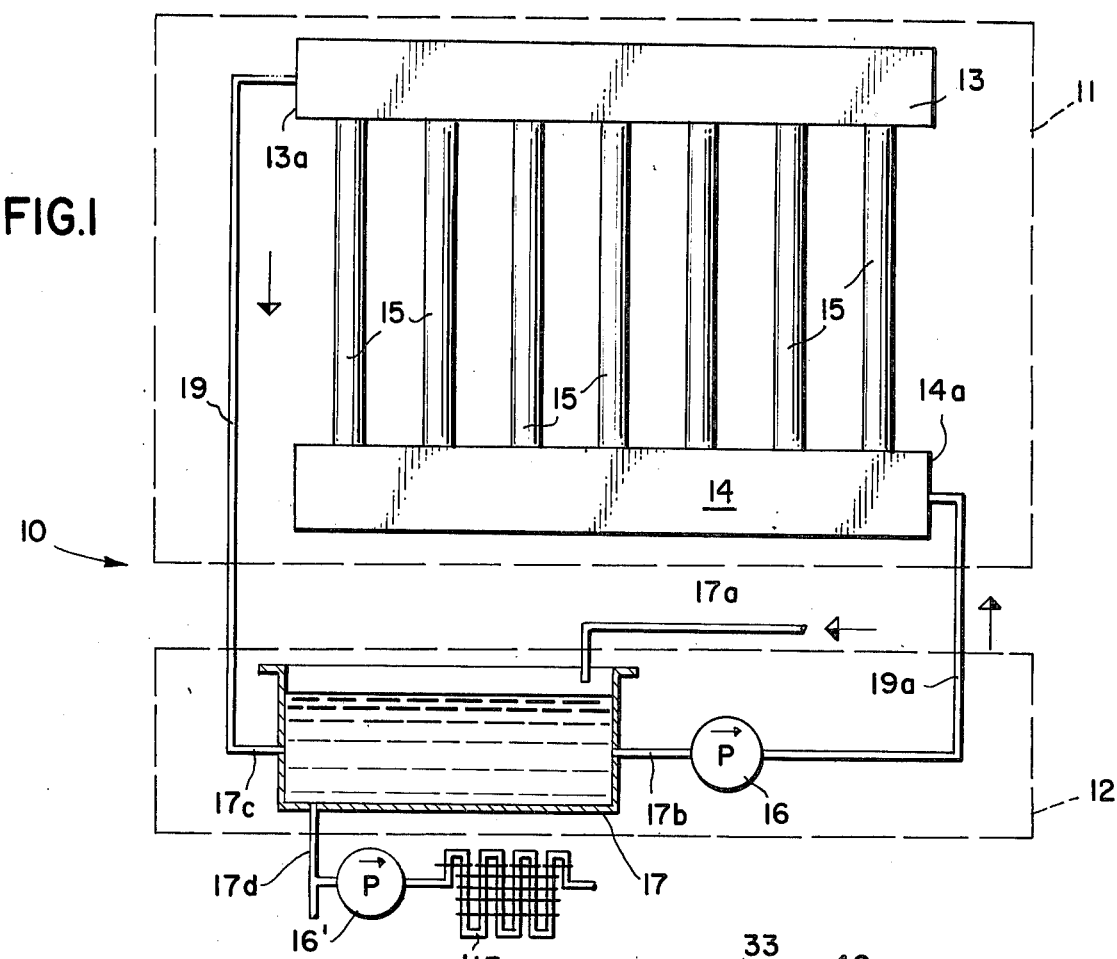

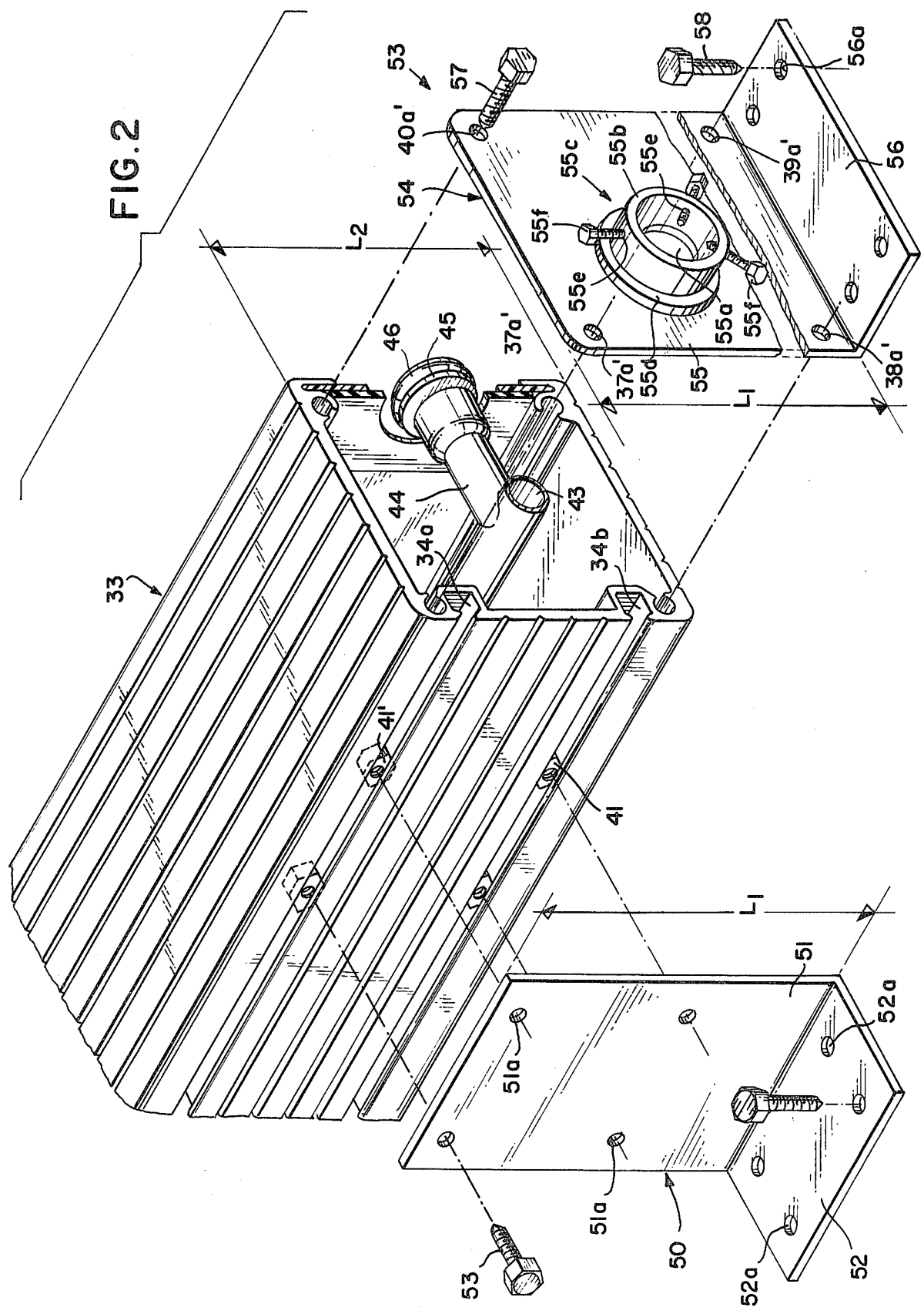

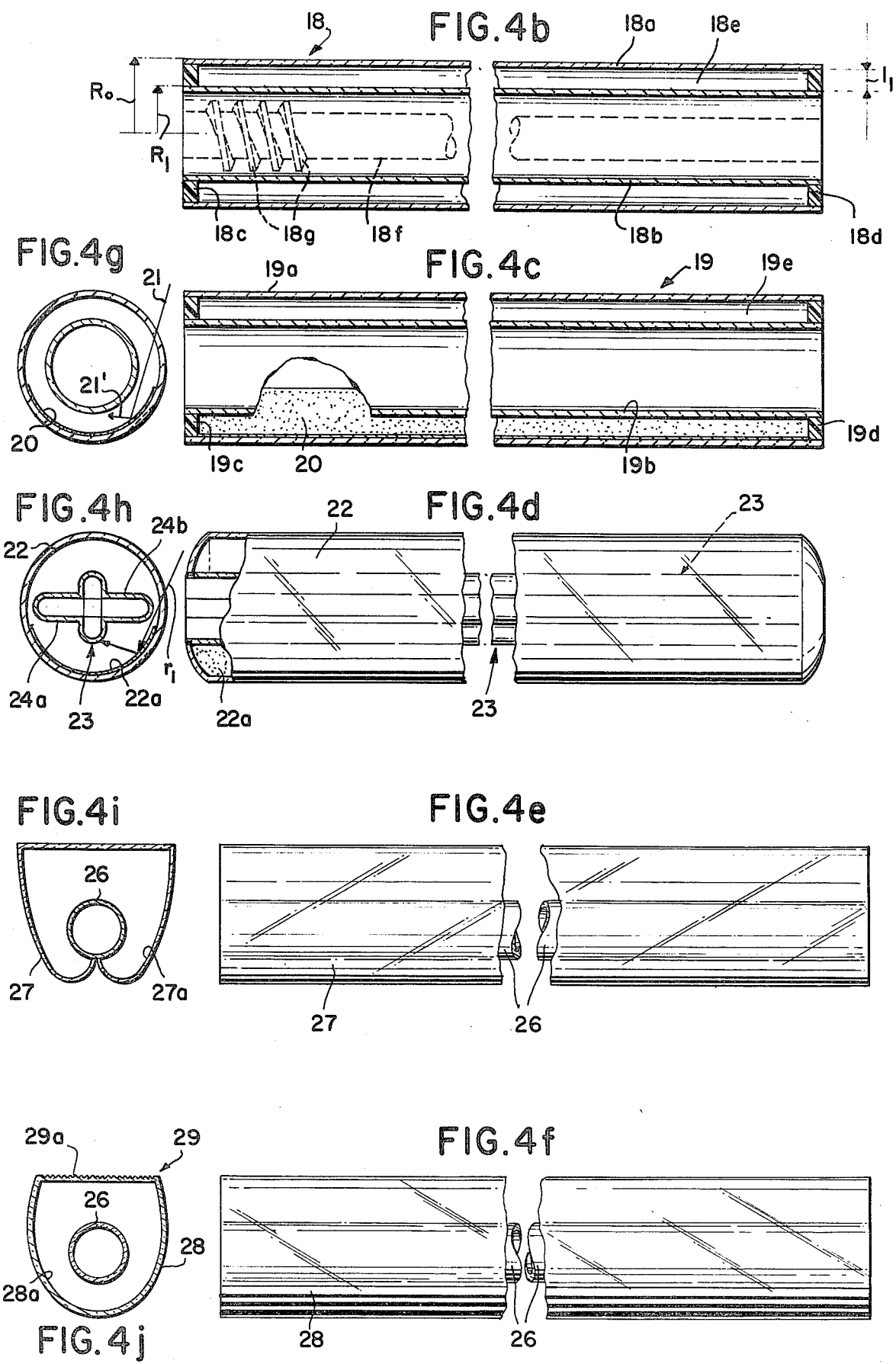

SOLAR ENERGY COLLECTOR

BACKGROUND OF THE INVENTION

The present invention relates to solar energy collectors and more particularly to a novel solar energy collector assembly adapted to accommodate collector tubes of varying lengths and/or designs, thereby enabling the fabrication of a solar energy collector system having an energy capacity to suit the requirements of the particular application.

Solar energy collector systems are presently increasing in popularity and importance due to the increasing emphasis on fuel and energy conservation.

Solar energy collectors are typically comprised of tubular members coated along one surface thereof in order to absorb heat energy from the sun's rays. Heat transfer is typically accomplished by passing a fluid such as water through the solar collectors and one of the manifolds into a fluid heat exchanger through a suitable conduit. Heat energy is extracted at the heat exchanger and the cooled and/or replenished fluid is then returned through a return conduit and the remaining manifold to be reintroduced into the solar collectors.

Since solar energy collectors of the type described hereinabove are typically mounted outdoors in order to take full benefit of the available solar energy, the apparatus must be rugged in design.

Exposure to the environment typically results in accumulation of polluting matter and other particulate which has a tendency to degrade the heating efficiency. In addition, harmful minerals and other constituents in the heat exchange fluid lead to accumulation of other harmful deposits in solar collectors requiring periodic maintenance.

Present day systems suffer from the disadvantages of being either difficult or impossible to disassemble, service and reassemble and to provide the simple and yet rugged design requirements necessary for continuous operation at high efficiency levels.

BRIEF DESCRIPTION OF THE INVENTION

The present invention is characterized by providing a solar collector assembly which overcomes all the disadvantages of conventional systems through the employment of a pair of novel manifold housing assemblies designed to facilitate full and rapid assembly and disassembly of the solar collector tubes, at the same time providing excellent fluid-tight couplings between the collector tubes and the manifolds.

The manifold housings are preferably elongated extruded members which may be cut to any desired length. The said housings are adapted to receive mounting brackets to provide for securement of the assembly to a supporting surface as well as providing a supporting structure of sufficient structural strength to support the weight of the fluid-carrying collector tubes.

Each manifold is provided with open-ended couplings, each being adapted to seat an "O" ring sealing member.

The collector tubes are mounted upon the manifolds by sliding one open end thereof upon one coupler in a telescoping manner and inwardly of the open end of the coupler by an amount sufficient to enable the opposite end of the collector tube to clear the co-operating coupler of the remaining manifold, whereupon the tube is then telescoped upon the cooperating coupler of the remaining manifold, the "O" ring serving to provide a fluid-tight seal between the manifold couplers and the collector tubes.

The collector tubes may be simply and readily removed for maintenance and/or replacement by moving the tube in one direction of its longitudinal axis to separate one end of the tube from its associated manifold coupler whereupon the tube is then tilted at an angle and is then moved along its longitudinal axis so as to withdraw the opposite end from its associated manifold coupler.

The foam installation material which substantially fills each manifold housing serves to prevent the heat transferred to the fluid flowing through the solar collector system from escaping into the atmosphere.

The collector tube mounting assembly may be utilized with tubes of varying design such as one-piece metallic, plastic or blackened glass tubes. The collectors may also be comprised of concentric inner and outer tubes with an evacuated space therebetween and the hollow interior space thereof being hermetically sealed. The outer surface of the inner tube is typically provided with an energy absorbing coating typically referred to as a selective surface which is capable of absorbing visible light energy and has an emissivity preferably in the range of 10% or less with regard to ultraviolet light energy and an absortivity of 90% or more. The tubes may have circular, polygonal or other cross-sectional configurations.

The housing and manifold assemblies may be arranged at any spaced separation distance and at any angular orientation to accommodate a diverse collector tube arrangement. Where fragile collector tubes are employed in the assembly, a wire mesh or plastic cover may be provided to protect the collector tubes from being damaged or broken while at the same time enabling substantially all of the solar energy to pass therethrough and thereby reach the collector tubes. A reflector may be placed beneath a group of collector tubes to further enhance the absorption of solar energy.

The fluid of the collector system may be either air, water or some other liquid heat transfer fluid, it being understood that the interior of the fluid passageways preferably are substantially enlarged when air is used in place of water or some other heat transfer fluid as the fluid medium.

OBJECTS OF THE INVENTION AND BRIEF DESCRIPTION OF THE FIGURES

It is therefore one object of the present invention to provide a novel mounting and fluid-carrying assembly for solar collector tubes and the like exemplified by its simplicity of design and ease of assembly and disassembly and maintenance while providing a ruggedized solar energy collector system.

Still another object of the present invention is to provide a solar collector tube mounting and fluid-coupling system which lends itself to a wide variety of arrangements depending only upon the particular application involved.

The above as well as other objects of the present invention will become apparent on reading the accompanying description and drawings in which:

FIG. 1 shows a simplified schematic view of a solar collector and heating assembly.

FIG. 2 shows an exploded perspective view of a manifold assembly designed in accordance with the principles of the present invention.

FIG. 3a shows a modified sectional view of a portion of the arrangement of FIG. 3 looking in the direction of arrows 3a—3a.

FIGS. 4b through 4f show side views of alternative collector tubes which may be employed with the manifold assemblies of the present invention.

FIGS. 4g through 4j show end views of the collector assemblies of FIGS. 4c, 4d, 4e and 4f, respectively.

FIG. 6 shows a detailed end view of one manifold assembly of the present invention.

DETAILED DESCRIPTION OF THE INVENTION

Figure 3A:
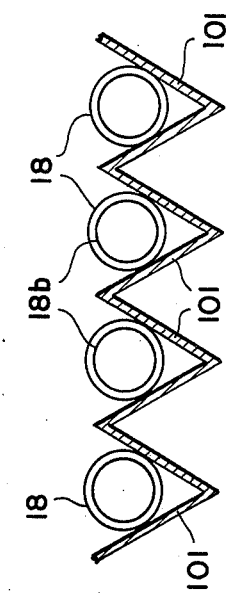

FIG. 1 shows a schematic view of a solar collector and heating assembly 10 comprised of a collector section 11 and a storage and supply section 12.

Section 11 is judiciously placed so as to take maximum benefit of the sun's rays, and may be mounted upon the ground or other supporting surface or upon the roof of a dwelling.

The solar collector assembly 11 is comprised of a pair of manifolds 13 and 14 having a plurality of collector tubes 15 spanning between connections of the manifolds. The manifolds 13 and 14, as well as the collector tubes 15, are hollow conduits adapted for the passage of a fluid therethrough. The manifold 14 has its right-hand end 14a coupled through a conduit 19a to pump 16 of the energy storage section 12, which is comprised of pump 16 and holding tank 17 adapted to be replenished with the system fluid through inlet 17a. Outlet 17b is coupled to the inlet of pump 16 while inlet 17c is coupled to the outlet end 13a of manifold 13 by means of conduit 19. The fresh water supply may be disconnected from tank 17 and directly coupled to the input of pump 16, if desired.

The solar collector tubes, as will be more fully described, absorb energy from both the visible and invisible rays of the sun. The absorbed energy is transferred to the fluid passing through each collector tube. The fluid passes from the bottom to the top as shown in FIG. 1 and the heated fluid is collected from each tube in manifold 13 where the conjoint flow is coupled through conduit 19 into a holding tank 17 which may for example be a hot-water tank, an outlet 17d may be provided for tapping the heated water into the appropriate outlets, i.e. radiators. In the case of a heat exchanger unit, the tank may be coupled to an undulating network HE of pipes by pump 16' and provided with radiating fins and having means (not shown) for blowing air therethrough to be carried through the duct work of a heating system. Obviously, other applications are possible.

The fluid may be returned to the system by pump 16 which pumps the fluid through conduit 19a and into manifold 14 and through its various outlets into the collector tubes 15 in order to have heat retransferred to the now-cooled fluid. Although one possible arrangement has been described, it should be understood that other arrangements for energy collection and usage may be utilized, depending only upon the needs of the user.

The collector tubes may assume a wide variety of shapes and arrangements. For example, considering the collector tube assembly 18 of FIG. 4b, the assembly is comprised of an outer glass tube 18a and an inner glass tube 18b whose diameter is less than tube 18a so as to provide a hollow annular-shaped interior space of a dimension $L_1$ measured along a radius of the assembly wherein $L_1$ is equal to the radius of outer tube 18a ($R_o$) minus the radius of the inner tube 18b ($R_i$) so that $L_1 = R_o - R_i$.

The spacing between the hollow cylindrical tubes is maintained by the epoxy seals 18c and 18d provided at opposite ends of the assembly. Although the hollow interior space 18e is sealed at both ends, in the embodiment of FIG. 4b, the interior space is not evacuated, since the epoxy seal is typically not capable of providing a hermetic seal.

FIGS. 4c and 4g show another embodiment 19 wherein outer tube 19a and inner tube 19b are arranged in much the same manner as the tubes of FIG. 4b and are sealed at their opposite ends by a glass seal 19c and 19d to provide a hermetic seal for the interior space 19e, which in the embodiment of FIG. 4c, is evacuated, typically to a vacuum of $10^{-4}$ torr.

In the embodiments of FIGS. 4b and 4c, the outer surface of inner tubes 18b and 19b are preferably coated with an energy-absorbing material which may be black paint, carbon black, or other suitable materials such as for example those described in U.S. Pat. No. 2,917,817. Typically the preferred materials have the characteristics of being capable of absorbing energy in both the visible and invisible spectrum of the sun's radiation. Characteristics of the coating are further desired to be energy-absorbing and substantially non-heat emissive. Preferred compositions for such coatings have emissivities of 10% or less and absorptance of 90% or more in order to provide solar energy collector systems of high efficiency.

As was described hereinabove, the inner and outer tubes may be formed of glass. However, other suitable materials may be employed. For example outer tube 18a may be formed of glass and inner tube 18b may be formed of metal having good conductivity or may even be formed of plastic. In the embodiment of FIGS. 4c and 4g, approximately one-third of the interior surface of tube 19a may be silvered or otherwise coated with a reflective material 20 in order to deflect radiation as represented by ray 21, toward the inner tube 19b, as represented by deflected ray 21'.

FIG. 4d shows still another embodiment for a collector tube which is comprised of outer tube 22, an inner tube 23 having oppositely directed fins 24a and 24b. Tube 23, together with fins 24a and 24b, has a substantially oval-shaped cross-sectional configuration as can best be seen in FIG. 4h. Tube 23 is sealed at its ends to tube 22 using metal to glass seals. The interior between the two tubes is preferably evacuated. The lower half of tube 22 may be provided with a silvered or mirrored finish as shown in 22a in order to cause light rays $r_1$ which strike the mirrored finish 22a, to be directed toward oval-shaped tube 23 and/or fins 24a–24b. As was described hereinabove, the exterior surface of tube 23 is provided with either a black or a selective coating for absorbing energy from both visible and invisible light wave lengths. If desired, a third tube 18f may be employed inside of tube 18b so that fluid flows in the hollow annular region between the outer surface of tube 18f and the inner surface of tube 18b. This arrangement increases the turbulence of the flow and provides increased transfer of heat energy from the energy absorbing coating to the fluid. Tube 18f may also have a helical fin pattern 18g extending around its exterior to further increase the turbulence.

The manner of operation of the embodiment of FIG. 4d is such that the fluid passing therethrough flows through the hollow interior of tube 23 to pick up the heat energy absorbed by the tube, the fins and the selective coating. The mechanism for tilting the tubes with fins has been omitted for purposes of simplicity.

FIGS. 4e and 4i show still another embodiment of the present invention wherein the collector tube 26 is positioned near the base of a reflective member 27 having a substantially W-shaped cross-section and having its interior surface 27a being either mirrored or comprised of a highly reflective surface coating. For example, member 27 may be formed of a metallic material whose interior surface is polished so as to be highly reflective. The design of the embodiment of FIGS. 4e and 4i is such as to maximize the amount of energy collected by the collector tube 26 regardless of the position which the sun occupies relative to the collector tube. This arrangement thus makes it possible to optimize the efficiency of the system without necessitating the use of any motor-driven or other mechanisms required for shifting the solar collector tubes so that their orientation is always adjusted for receipt of the maximum amount of energy from the sun's rays as the sun changes position relative to the collector assembly. The reflector also tends to concentrate the sun's rays, to render the small heat absorptive surface more effective.

Still another embodiment of the collector tube arrangement is shown in FIGS. 4f and 4j wherein collector tube 26 is arranged within a reflective assembly 28 similar to that shown in FIG. 4i and having an interior reflective surface 28a. Positioned across the open top end of the reflective member is a closure plate 29 having a fresnel lens configuration along its upper surface 29a in order to concentrate the sun's rays upon the collector regardless of their orientation, into either the collector tube 26 or the reflective member 28 so as to enable the sun's rays to be further reflected toward collector tube 26. It should be understood that the tubes 26 of FIGS. 4e and 4f for example may be of the type shown in any of the prior FIGS. 4b, 4c and 4d or may be simply a single collector tube painted black. Obviously other forms of tubes may be utilized, depending only upon the particular application.

Figure 3:
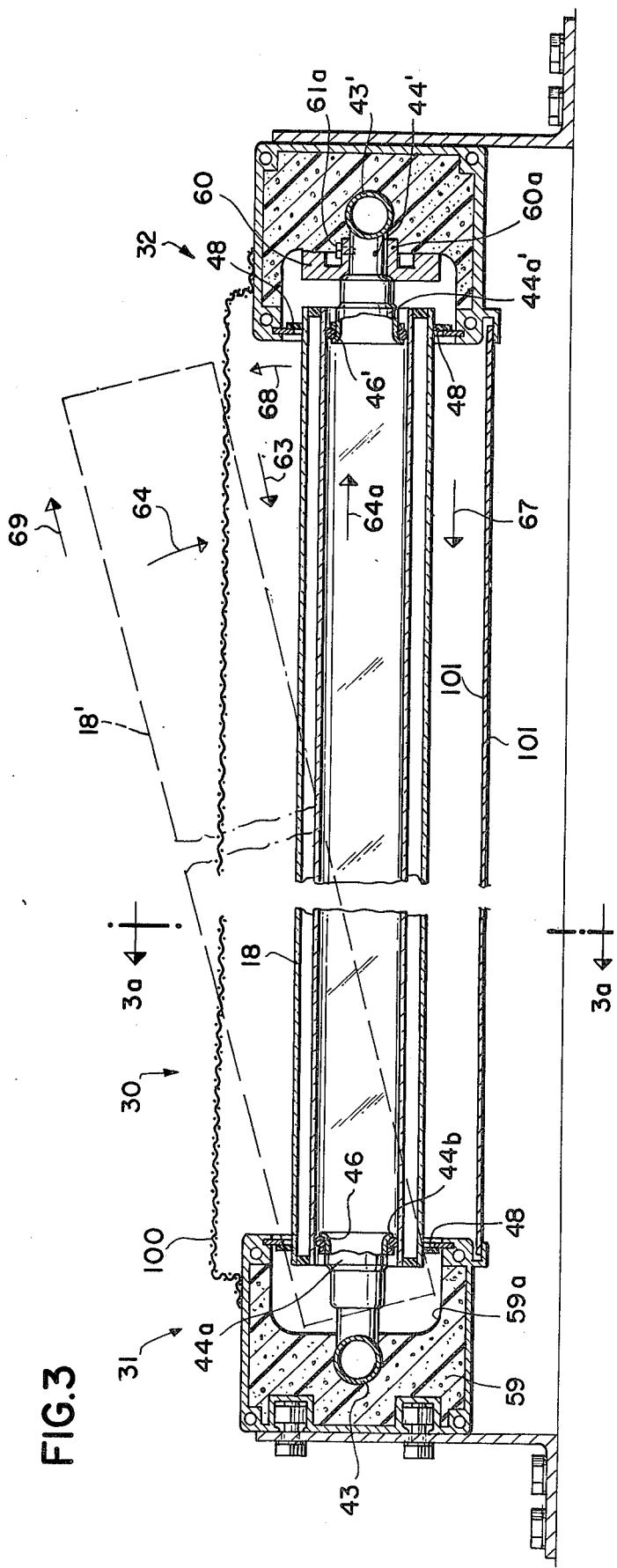
FIG. 3 shows an elevational view, partially sectionalized, of the collector tube and the manner of its interconnection with first and second manifold assemblies.

FIG. 3 shows the manner in which a collector tube is mounted within manifold assemblies of the present invention. The apparatus 30 of FIG. 3 comprises left and right-hand manifold assemblies 31 and 32 which are substantially similar in design. For this reason, only assembly 31 will be described in detail, it being understood that assembly 32 is of the same design, and performs substantially the same functions.

As shown in FIGS. 3 and 6, manifold assembly 31 is comprised of a substantially U-shaped housing 33, preferably being an extruded aluminium section, although capable of being formed of other materials, such as plastic, in an extruded fashion. The extruded housing assembly 33 has a substantially U-shaped cross-sectional configuration comprised of a vertical wall 34 integrally joined with two horizontally aligned walls 35 and 36. The internal corners 37, 38, 39 and 40 are each respectively provided with substantially C-shaped openings 37a-40a for receiving threaded fasteners in a manner to be more fully described.

Vertical side wall 34 is provided with substantially rectangular-shaped recesses 34a and 34b extending the length of the extrusion. Each of these recesses are provided with over-hanging flanges 34a-1 and 34a-2 as well as 34b-1 and 34b-2. The recesses are adapted to receive hexagonal, rectangular or polygonal-shaped fasteners, such as nuts 41 which may be slideably inserted at one end of the extrusion for enabling alignment at any position along the length of the grooves in order to secure a fastening bracket thereto in a manner to be more fully described. The flanges 34a-1 through 34b-2 prevent the nuts from being pulled outwardly.

In like fashion, the openings 37a-40a are adapted to receive threaded fasteners for securing end brackets to the extrusion.

Substantially centrally located within the extrusion is a manifold assembly 42 comprised of an elongated manifold tube 43 having a plurality of branch tubes 44 joined thereto at spaced intervals along the length of the manifold tube. The outward end of tube 44 is provided with a portion 44a thereof of enlarged diameter serving as coupling means in a manner to be more fully described.

The enlarged tubular portion 44a is flared outwardly at its marginal edge flange portion 44b. Spaced inwardly from the outwardly flared edge 44b is an annular flange 45 which, together with the outwardly flared portion 44b, serves as a means for receiving and retaining an O-ring 46 positioned in the groove formed by outwardly flared portion 44b and flange 45. The flange 45 may be soldered or press-fitted to tube 44a.

The open end of extruded housing member 33 may be substantially covered by means of an elongated flat plate 47 slideably inserted within two grooves 35b and 36b which are respectively formed and defined by the inwardly directed flanges 35a and 36a and the adjacent surfaces of the portions forming openings 40a and 39a. The plate 47 is provided with an opening 47a of a diameter sufficient to permit the entry of one end of a collector tube when mounting and/or dismounting, as will be more fully described. It should be understood that plate 47 is of a length equivalent to the length of the extruded housing member 33 in which it is inserted. Each of the openings 47a is arranged to coincide with the coupling member 44a whose free end (flange 44b) lies just inside plate 47.

One surface of plate 47, adjacent the margin of each opening 47a is fitted with a flexible resilient member 48 preferably formed of rubber and adapted to yield in the presence of or upon the insertion or removal of a collector tube in a manner to be more fully described.

Turning now to a consideration of FIG. 2 in which like elements are designated by like numerals as between FIGS. 6 and 2, there is shown therein a pair of tapped threaded nuts 41 and 41' which have been inserted into the rectangular-shaped grooves 34a and 34b and which have been arranged along these grooves to a position inward from the righthand end thereof. Obviously the distance which the bolts are moved along these grooves is dependent only upon the location of the bracket which is to be secured thereto.

FIG. 2 shows such a bracket 50 in exploded fashion relative to the extruded housing member 33, said bracket having a substantially L-shaped configuration and being comprised of an upright arm 51 integrally joined to a horizontally-aligned arm 52, each of said arms being provided with clearance openings 51a and 52a respectively. One typical threaded fastener such as a bolt 53 is adapted to be inserted through the upper right-hand opening of vertically-aligned arm 51 and to be threadedly received by nut 41'. In a similar fashion, other bolts may be inserted through the remaining openings 51a and be threadedly received by nuts inserted into the grooves 34a and 34b and appropriately positioned so as to be in alignment with the openings 51a and hence with the threaded fasteners or bolts to be inserted therein. The undercut grooves such as 34a-1 and 34a-2 (see FIG. 6) serve to prevent the nuts 41 and 41' from being removed from the grooves so as to assure a tight securement of bracket 50 to side wall 34 once the threaded fasteners 53 are secured in their associated nuts 41.

The horizontally-aligned arm 52 may then be secured to any suitable supporting surface such as the diagonally-aligned or horizontally-aligned roof of a house, or any other supporting surface. It should be understood that the vertical height of arm 51 may be adjusted so as to position the extruded housing member 33 either slightly above or more than slightly above the roof surface dependent upon the particular application. Also arm 52 need not be arranged in perpendicular fashion relative to arm 51 but may form either an acute or an obtuse angle relative thereto, depending upon the particular mounting requirements, and also for the purpose of tilting the solar panel assembly at an angle to the horizontal plane.

It is typical that at least one bracket 50 of the type shown in FIG. 2 will be mounted preferably at a point intermediate the extreme ends of extruded housing member 33. However, in applications where the extruded housing member is of a substantially great length, additional such brackets may be provided at spaced intervals therealong for added structural supporting strength. In any case, an end bracket is secured at each of the opposite ends of the extruded housing member 33 of the form of bracket 53 shown in FIG. 2. Bracket 53 is similar in design to bracket 50 and is comprised of a upright arm 55 integrally joined to a generally horizontally aligned arm 56. Arm 55 is provided with a plurality of openings 37a', 38a' 39a', and 40a' of the extruded housing member 33. The diameters of openings 37a–40a are preferably slightly less than the diameter of the threads provided in the threaded member 55a which may preferably be self-tapping type threaded members in order to cut a thread into openings 37a–40a an thereby firmly secure arm 55 of bracket 54 to the extruded housing member 33. Brackets at both ends may be joined in this fashion.

Arm 56 is provided with openings 56a for receiving threaded fasteners 58 in order to join bracket arm 56 securely to a supporting surface. As was mentioned hereinabove, the bracket arms 55 may be of any suitable length so as to position the extruded housing member 33 either slightly above or substantially above the supporting surface and the arms 55 and 56 may be oriented at any angle relative to one another other rather than simply being arranged at a right angle, depending only upon the requirements of the particular installation.

As can further be seen, the vertical arm 55 is provided with a generally centrally located opening 55b for passage of the manifold tube 43 therethrough in order to provide connection of the manifold tube into the heat exchanger or other component of the solar collector system.

The manifold tubes 43 and 43' are maintained in proper position through the use of the mounting collars 55b which are arranged on each mounting bracket 55 so as to be coaxial with opening 55a. Collar 55b is provided with a flange 55d which is welded or otherwise secured to the outer surface of bracket 55. The cylindrical section 55b thereof extends outwardly from the outer surface and is adapted to receive that portion of the manifold tube 43 extending beyond the end of the extruded housing section. Three tapped apertures 55e are provided in the collar 55b at 120° intervals. Each of these tapped openings receives an aligning and locking set screw 55f which initially serves to properly center and align the manifold tube 43 extending therethrough and, by further tightening of all three set screws, serves to lock or secure the manifold tube in position so as to prevent any movement of the manifold tube in the direction of its longitudinal axis. Obviously, a collar of the same type may be provided on the opposite end bracket for securing the opposite end of the manifold tube thereto in a similar fashion. Preferably the manifold tube may be fitted with an end cap or closure member sealing end. If desired, when adding additional sections, the end cap may be removed and an added coupling conduit may be connected between the original section and the newly added section thereby further enhancing the overall flexibility of the system.

Turning to a consideration of FIG. 3, each of the extruded housing members 31 and 32 can further be seen to be provided with foam insulation 59 which substantially fills the interior of extruded housing member 33 except for the region defined as a substantially U-shaped recess portion 59a which accommodates the coupling portion of the manifold and which further accommodates one end of the collector tube.

The manifold 43' of the right-hand manifold assembly is shown in FIG. 3 as having one connecting tube 44' coupled thereto. A toroidal shaped spacer member 60 is secured to connecting tube 44' at a position between manifold tube 43' and the enlarged diameter portion 44a' of the connecting tube. The spacer member, which functions in a manner to be more fully described, abuts against manifold tube 43'.

Although not shown in figure, it should be understood that the foam insulation 59 filling the housing of the left-hand manifold assembly 31 is utilized in a similar fashion to fill the housing member of the right-hand manifold assembly and has been omitted for purposes of simplicity.

The manner in which the collector tube is assembled, is as follows:

A collector tube assembly such as the collector tube as shown in FIG. 4b, is oriented so that its left-hand end is positioned in close proximity to coupler member 44a and so that the tube is oriented generally diagonally as shown by the dotted tube configuration 18' of FIG. 3. The tube is then moved in the direction shown by arrow 63 to telescope a portion of the left-hand end of the tube on to the coupling tube 44a and by an amount sufficient to allow the right-hand end of the collector tube to clear the left-hand end of the right-hand manifold assembly 32. The collector tube 18 may then be tilted or swung downwardly in the direction shown by arrow 64 so as to move the right-hand end of the collector tube into alignment with the left-hand end of the coupling tube 44a'. Once the collector tube 18 is co-aligned with connecting tube 44a', the tube may then be moved in the direction shown by arrow 64a so as to telescope the inner tube telescopingly over the exterior of connecting tube 44a'. The extent to which collector tube 18 may be moved in the direction shown by arrow 64a is obviously limited by spacer 60. This spacer 60 may be utilized to great advantage in installations wherein the solar energy collector system is oriented in a diagonal fashion, by placing the right-hand manifold assembly 32 at the lower end of the roof or supporting structure while placing the left-hand manifold assembly 31 at the upper or left-hand end of the sloping roof. Thus, if the individual collector tubes experience any movement downward as a result of the effect of gravity upon the collector tubes within the solar energy collector system, linear movement to the right is thus restrained by spacer 60 once the right-hand end of collector tube 18 bears against the left-hand surface of spacer 60. Obviously, the length of the individual collector tube assemblies are chosen so as to make frictional engagement with each of the O-rings 46 and 46' even in the case where the solar collector tubes move the maximum extend toward the right and thereby bear against an associated spacer 60.

Upon insertion of a collector tube, it should be understood that the thin flexible gasket 48 will tend to yield or bend inwardly to accommodate the insertion of the collector tube. This will be the case for each such resilient gasket provided in each of the manifold assemblies 31 and 32. Each gasket provides a yieldable fitting about the exterior surface of each collector tube and thereby serves to prevent the entry of dirt, contaminating matter or other particulate carried by the atmosphere, so as to keep the system reasonably clean while at the same time facilitating assembly and disassembly of the system components and especially the collector tubes.

Disassembly of the tubes may be accomplished in much the same fashion as assembly in the sense that the collector tube may then be moved to the left as shown by arrow 67, by an amount sufficient to allow the right-hand end of collector tube 18 to clear the left-hand end of the manifold assembly 32. Once the tube has cleared the left-hand surface thereof, the tube may then be tilted upwardly in the direction of arrow 68 until the lower surface of the collector tube clears the top surface of the right-hand manifold assembly 32 whereupon the collector tube may then be moved in the direction of arrow 69 thereby completely removing the collector tube from the assembly, for inspection, maintenance and/or replacement. The simplified arrangement thus enables the collector tubes to be removed for inspection and/or cleaning purposes and to be simply and readily replaced. The O-rings which are preferably made of a suitable resilient material such as neoprene, rubber or the like, have been found to provide a more than adequate gas and/or liquid seal to prevent the egress of the fluid to which energy is being transferred. The O-rings have been found to be capable of withstanding temperatures encountered in a wide variety of applications in which the solar collector systems are employed and far in excess of the boiling point of water. The foam insulation 59 serves to significantly reduce the amount of energy lost by the fluid to the atmosphere, as well as the heat energy in the manifold tube 43 through which the heated fluid passes. Preferably, the housing 32 is provided with the same type of foam insulation since the entering fluid is at a somewhat elevated temperature level.

The design of the manifold assemblies is such as to permit a wide variety of system installations from the viewpoint of installation arrangement and energy storage capacity. For example, since the extruded housing members may be cut to any size, it is a simple matter to design overall length to adjust for the particular capacity of the system whose application is being fulfilled. Also since the systems are typically utilized with collector tubes of similar or identical length, it would therefore be conventional to arrange the manifold assemblies in spaced parallel fashion. However, the nature of this system is such as to enable the manifold assemblies to be arranged in a non-parallel fashion, if desired, in order to accommodate tubes of gradually-decreasing length, for example.

Although the typical arrangement preferably consists of collector tubes arranged in spaced parallel fashion, other arrangements are certainly possible. For example, considering the arrangement of FIG. 5a, a substantially S-shaped collector tube 70 is shown as being comprised of an inlet opening 70a, a first U-shaped bend 70b, a second U-shaped bend 70c and a second open end 70d wherein flow therethrough is represented by the progression of arrows 71. Connection may be accomplished by coupling openings 70a and 70d to couplings of the manifold assembly which are offset from one another and which obviously are co-aligned with openings 70a and 70d. In order to provide an arrangement of additional structural strength, coupling connections 70e and 70f may be provided, which couplings are of substantially cylindrical shape but through which no fluid is cased to flow due to the closed arrangement of the tubes, sections 70e and 70f simply being added to the exterior of the closed tubes for providing support at four points along the tube structure. If desired, only one section 70e (or 70f) may be employed and the other omitted.

Figure 5A:
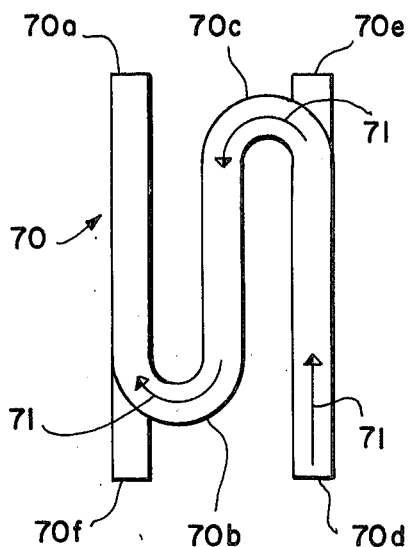
FIGS. 5a through 5d show still further alternative embodiments for collector tubes which may be utilized with the manifold assemblies of the present invention.
Figure 5B:
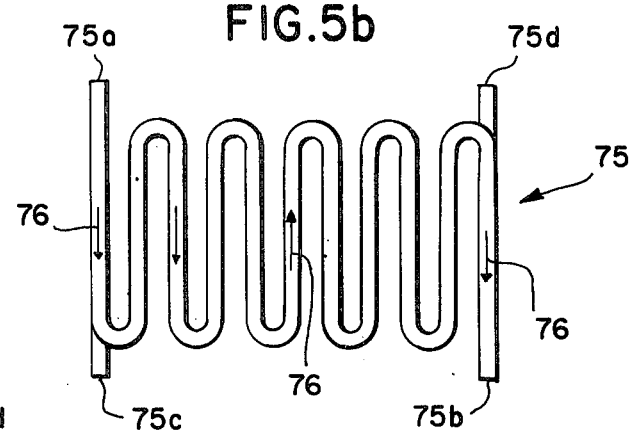

FIG. 5b shows a similar arrangement wherein the collector tube assembly 75 is comprised of a plurality of such U-shaped sections forming an undulating arrangement with flow therethrough being represented by progression of arrows 76 arranged therethrough. The collector tube assembly structure 75 of FIG. 5b is shown as having an inlet opening 75a and an outlet opening 75b. For additional supporting strength the cylindrical coupling sections 75c and 75d are provided for connection with the mounting coupling such as for example the coupling 44a of FIG. 6.

The collector 75 of FIG. 5b is shown as being provided with a greater number of undulations than the embodiment of FIG. 5a.

Figure 5C:
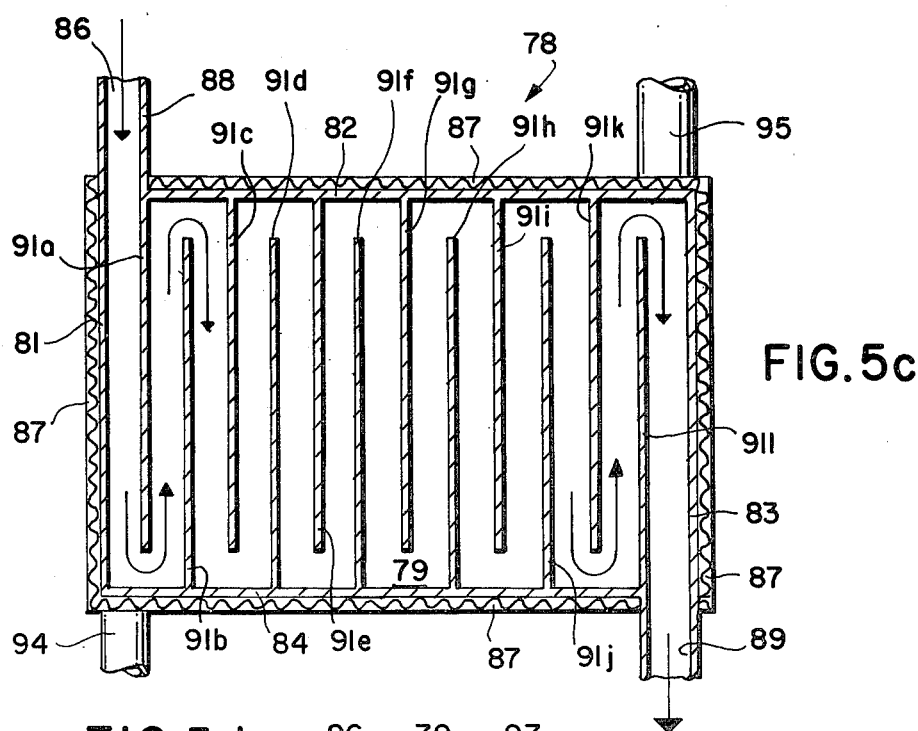
Figure 5D:
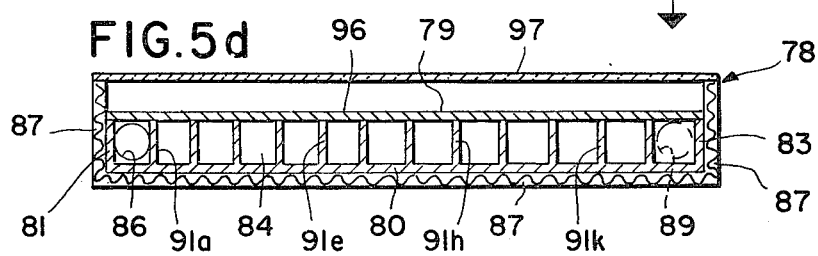

FIGS. 5c and 5d show a still further embodiment wherein the collector tube assembly 78 is comprised of a pair of spaced parallel plates 79 and 80 joined by side walls 81, 82, 83 and 84 to define a hollow interior having an undulating flow path formed by interior directional barriers 91a–9l said path being shown by arrows 86. Sides 81–84 and bottom plate 80 are covered with insulation 87. Inlet and outlet openings 88 and 89 extend outwardly from side walls 82 and 84 in opposite directions for mounting with the couplings described above. Strengthening members 94 and 95 are provided at the remaining diagonal corners of the assembly 78. Plate 79 has its top surface covered with a selective coating 96 of the type described hereinabove.

The size of the unit, as well as the number of directional barriers, may be adjusted to suit the particular application.

The assembly 78 is covered with a transparent sheet 97 (preferably glass) arranged a spaced distance above the selective surface 96. This arrangement provides a collector tube structure of increased overall length L while reducing the distance D between the manifold assemblies.

With regard to any of the above-described embodiments, it can be seen that a wide variety of configurations of collector tube structures may be employed. The nature of the manifold assembly extruded housing sections is such as to be capable of being cut to any desired length to accommodate any system application. Added supporting strength for the manifold assemblies may be accomplished by providing additional brackets of the type shown by bracket 55 at spaced intervals along the length of each manifold housing section. The mounting is quite simple due to the provision of the elongated under-cut U-shaped grooves 34a and 34b as shown in FIG. 2 to greatly simplify the insertion and placement of the threaded nuts slideably mounted therein. Obviously the mounting of the end brackets is similarly facilitated due to the unique nature and design of the extruded housing section.

Although the coupling sections 44a and 44a' shown in FIG. 3, for example, are shown as having circular cross-section, it should be understood that while the circular shape is preferred, the sections may be formed of other configurations, such as square, rectangular, polygonal and so forth.

Figure 4A:
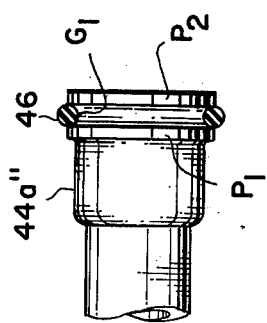
FIG. 4a shows an alternative arrangement for the manifold coupling assembly which receives a collector tube.

The design as shown in FIGS. 3 and 6 shows the manner in which each O-ring 46 is seated between a flange 45 and outwardly flared portion 44b of coupling tube 44a. As an alternative arrangement, there is shown in FIG. 4a a coupling section 44a" which is bent or otherwise machined so as to be provided with a pair of outwardly directed U-shaped portions $P_1$ and $P_2$ which define therebetween an inwardly directed groove $G_1$ serving as a groove for seating O-ring 46, thereby eliminating the need for flange 45 and the welding or machine operation necessary for mounting the flange. Although polygonal, square and rectangular shapes would place undue stress upon the O-ring at the sharp corners thereof, these corners may be rounded in the manner of the rounded corners 37 through 40 of the extrusion section 33 shown in FIG. 6 so as to relieve stress from the O-rings and thereby prevent premature wearing or damage thereof. It should be further understood that non-polygonal shapes such as for example the substantially U-shaped cross-sectional configuration of FIG. 4j may be provided for both the tube assembly and the coupling connection.

If desired, the assembly as shown in FIG. 3 may be provided with a cover screen 100 arranged to protect the collector tubes from being damaged while at the same time permitting the transmission of substantially all of the sun's rays therethrough. In addition thereto, a reflector sheet 101 may be provided beneath the assembly and either have a polished reflective surface 101a or a mirrored finish provided thereon to reflect radiation from the sheet 101 upwardly towards the collector tubes. The sheet 101 may be flat or may have a saw tooth configuration as shown in FIG. 3a to provide a focussing effect not obtained with a planar shape.

Many variations and modifications will now become apparent to those skilled in the art. It is preferred therefore that the present invention be limited not by the specific disclosure herein but only by the appended claims.

What is claimed is:

1. A manifold assembly for solar energy collectors comprising:

an elongated manifold for coupling the collectors at spaced intervals along the length of the manifold;

an elongated housing section enclosing said manifold and having a main intermediate wall and first and second sidewalls integrally joined to opposite ends of said main intermediate wall whereby said main intermediate wall defines an elongated closed side of said housing section and the free ends of said housing section define an elongated open side through which the collectors may extend, while said main intermediate wall and side walls collectively define first and section open ends;

said section having fastener receiving portions extending the length of said housing section and arranged at spaced intervals along one surface of said section;

an end mounting bracket for securement to said first end of said housing section, said end mounting bracket having a first bracket arm positioned against said first end and including support means for supporting the end of said manifold adjacent said first end of said housing section;

openings provided in said first bracket arm each being aligned with one of said fastener receiving portions;

threaded fastening members being inserted through each of said openings for threadedly engaging of said fastener receiving portions to firmly secure said first bracket arm to said housing section; and said mounting bracket having a second bracket arm for joining said mounting bracket to a supporting surface.

2. The manifold assembly of claim 1 wherein the exterior side of said main intermediate wall is provided with a pair of spaced longitudinal grooves, each of said grooves having a pair of projections extending over the open end of said groove for slidably receiving threaded nuts conforming to the cross-sectional shape of said groove and slidable therealong to any desired position.

3. The manifold assembly of claim 2 further comprising an intermediate wall bracket having a bracket arm provided with openings arranged to overlie said longitudinal grooves when said intermediate wall bracket arm is positioned against the exterior side of said main intermediate wall; and threaded fastening members inserted through said intermediate wall bracket arm openings for firmly securing said intermediate wall bracket arm to said main intermediate wall at any desired location along the length of said housing section.

4. The manifold assembly of claim 1 wherein said elongated manifold comprises a manifold tube centrally arranged within said housing section and having a longitudinal axis generally parallel to said main intermediate wall;

wherein said manifold assembly further includes a plurality of coupler tubes joined to said manifold tube at spaced intervals therealong so that the interiors of said coupler tubes communicate with the interior of said manifold tube; and wherein said support means on said first bracket arm of said end mounting bracket comprises a tube opening through which said end of said manifold tube adjacent to said first end of said housing section extends and means mounted to said first bracket arm adjacent said tube opening for securing said end of said manifold tube passing through said opening to said end mounting bracket.

5. The manifold assembly of claim 4 wherein said said first and second sidewalls further include first interior grooves arranged to face one another and being in alignment;

and wherein said manifold assembly further includes an elongated cover plate having its opposite longitudinal edges slidably mounted within said first interior grooves, said cover plate having a plurality of openings arranged at spaced intervals along said plate, each opening being aligned with one of said coupler tubes.

6. The manifold assembly of claim 5 wherein said cover plate further comprises flexible annular shaped resilient gasket members secured to said plate about the marginal portion of each plate opening whereby the outer surface of the end of a collector tube inserted into said opening will be encircled by said gasket to prevent external influences such as dust, dirt and other harmful particulate from entering into the interior of the section.

7. The manifold apparatus of claim 4 wherein each of said coupler tubes is provided with a free open end having a groove along the exterior surface and adjacent to said free end; and a resilient compliant O-ring member inserted in said groove and being of a size relative to said groove so as to be at least slightly stretched when positioned within said groove.

8. The manifold assembly of claim 7 further including a plurality of collector tubes mounted upon said coupler tubes such that the internal surface of each collector tube forms a fluid tight seal with said O-ring member engaging the interior surface of said collector tube.

9. The manifold assembly of claim 8 wherein said fastener receiving portions have substantially U-shaped cross-sections.

10. The manifold assembly of claim 8 wherein said collector tubes are provided with a coating adapted to absorb energy from the suns visible and invisible light rays.

11. The manifold assembly of claim 8 wherein said collector tubes are each formed of a black plastic material.

12. The manifold assembly of claim 8 wherein said collector tubes are each comprised of an outer transparent tube, and inner tube of smaller diameter positioned within said outer tube and having an energy absorbing coating provided along the exterior surface of the inner tube; and sealing means provided at the ends of each collector tube for maintaining the inner and outer tubes in spaced and generally concentric fashion.

13. The manifold assembly of claim 12 wherein said sealing means comprised means for hermetically sealing the hollow interior space between said outer and inner tubes, said hollow space being evacuated to a predetermined vacuum condition.

14. The manifold assembly of claim 12 further including a reflective coating along a portion of the interior surface of said outer tube for reflecting the light rays striking said reflective coating towards said energy absorbing coating.

15. The apparatus of claim 12 further comprising an elongated substantially U-shaped trough-like reflective body, each of said collector tubes being positioned within said reflective body so that said collector tubes receive maximum exposure to the sun's rays regardless of the position of the sun without mechanically or manually repositioning said collector tubes during the course of each day.

16. The manifold apparatus of claim 15 further including a fresnel lens cover fitted upon the upper end of said reflective body to further enhance efficiency and energy transfer of the sun's energy to the fluid passing through said collector tubes.

17. The apparatus of claim 4 further having a collector comprising:

a box-like enclosure having top and bottom sides joined in spaced fashion by sidewalls;

said top side having a transparent cover aligned to face the sun;

an energy absorptive surface positioned beneath said cover;

a first inlet opening being provided in one sidewall near a corner of said enclosure;

a second outlet opening being provided in an opposite sidewall diagonally opposite said first opening;

a plurality of baffle plates being arranged at spaced intervals within said enclosure and cooperating with said enclosure to define an undulating path between said first and second openings;

at least one of said coupler tubes being joined to said first inlet opening for feeding a fluid into said first inlet opening from said manifold tube whereby the fluid follows said undulating path to reach said outlet opening; and said top side bing adapted to absorb solar energy and transfer the absorbed energy to the fluid to elevate the temperature thereof when the fluid exits from said outlet opening.

18. The apparatus of claim 17, wherein collector further includes at least one hollow stabilizing projection adapted to be mounted upon one of said coupler tubes other than said at least one coupler tube joined to said inlet opening to provide additional support for said collector.

19. A solar energy collector system comprising:

first and second manifold assemblies each comprised of a manifold tube and a plurality of coupler tubes connected at spaced intervals along said manifold tube whereby the interiors of said coupler tubes communicate with the interior of said manifold tube, each of said coupler tubes having a free end remote from said manifold tube;

said manifold tubes being arranged in spaced apart fashion with the free ends of said coupler tubes of said first and second assemblies generally facing one another;

each of said coupler tubes having an annular groove extending around the outer periphery thereof and position adjacent said free end thereof;

a stretchable resilient compliant O-ring positioned in said groove and being of a size which is designed to be at least slightly stretched when sealed in said groove;

at least one elongated collector tube having first and second coupler receiving ends whereby the interior surface of said receiving ends receive said free ends of said coupler tubes and encircle and at least slightly compress said O-ring which it encircles;

the distance between said free ends of said coupler tubes of said first and second assemblies receiving said at least one collector tube being separated by a distance which is less than the length of said at least one collector tube so that said O-rings of said coupler tubes receiving said at least one collector tube are spaced apart by a distance which is less than the length of said at least one collector tube.

20. The apparatus of claim 19 wherein each manifold assembly further comprises a hollow elongated housing for receiving said manifold tube, said housing having an elongated open side through which said coupler tubes extend;

said housing being open at both ends and having a uniform cross-section provided with fastener receiving portions at spaced intervals along the interior thereof and extending the entire length of the housing;

bracket means secured to said open ends of said housing to cover said open ends and support the ends of said manifold tube received in said housing;

said bracket means including fasteners threadedly engaging said fastener receiving portions for securing said bracket means to said housing, said uniform cross-section being adapted to enable said housing to provide securement for said fasteners regardless of the length of said housing.

21. The apparatus of claim 20 wherein each of said housings is substantially filled with a light-weight foam insulation material surrounding said manifold tube to prevent the loss of heat energy from said manifold tube to the atmosphere, said foam insulation having recesses in the regions of said free ends of said coupler tubes to permit unhindered insertion and mounting of said at least one collector tube upon said coupler tubes in a telescoping fashion.

22. The apparatus of claim 19 wherein said at least one collector tube has an undulating configuration, and an inlet and an outlet opening at the free ends thereof for telescopingly receiving said coupler tubes of said first and second manifold assemblies.

23. The apparatus of claim 22 wherein said at least one collector tube further includes at least one additional coupling extension for telescopingly receiving one of said coupler tubes, and means for sealing the end of said at least one coupling extension of said at least one collector tube to prevent the flow of fluid therethrough from the interior of said at least one collector tube.

24. Solar collector apparatus comprising:

a box-like enclosure having top and bottom sides joined in spaced fashion by sidewalls;

said top side having a transparent cover aligned to face the sun;

an energy absorptive surface exposed to the solar radiation positioned beneath said transparent cover;

a first inlet opening being provided in one sidewall near a corner of said enclosure;

a second outlet opening being provided in an opposite sidewall diagonally opposite said first opening;

a plurality of baffle plates being arranged at spaced intervals within said enclosure and cooperating with said enclosure to define an undulating path between said first and second openings;

a first manifold assembly for feeding a fluid into said first opening whereby the fluid follows said undulating path to reach said outlet opening, said first manifold assembly including means for removably connecting said first manifold assembly to said first opening for facilitating assembly and disassembly of said solar collector apparatus;

said top side being adapted to absorb solar energy and transfer the absorbed energy to the fluid to elevate the temperature thereof when the fluid exits from said outlet opening; and a second manifold assembly for receiving the heated fluid which has been conducted to said outlet opening, said second manifold assembly including means for removably connecting said second manifold assembly to said second outlet opening for facilitating assembly and disassembly of said solar collector apparatus.

25. The collector apparatus of claim 24 wherein said bottom side and said sidewalls are insulated to reduce the loss of energy in said housing to the surroundings.

* * * * *